(12) United States Patent
Cui et al.

(10) Patent No.: US 12,467,146 B2
(45) Date of Patent: Nov. 11, 2025

(54) HIGH-STRENGTH MULTI-FUNCTIONAL COATING WITH MULTI-LEVEL STRUCTURE, AND PREPARATION METHOD THEREOF

(71) Applicants: Ocean University of China, Qingdao (CN); Ningbo Branch of China Academy of Ordnance Science, Ningbo (CN)

(72) Inventors: Hongzhi Cui, Qingdao (CN); Wei Huang, Ningbo (CN); Feiya Liu, Qingdao (CN); Guoliang Ma, Qingdao (CN); Boyu Jiang, Ningbo (CN); Cuidi Mo, Qingdao (CN); Liukui Gong, Ningbo (CN)

(73) Assignees: Ocean University of China, Qingdao (CN); Ningbo Branch of China Academy of Ordnance Science, Ningbo (CN)

( * ) Notice: Subject to any disclaimer, the term of this patent is extended or adjusted under 35 U.S.C. 154(b) by 0 days.

(21) Appl. No.: 18/969,925

(22) Filed: Dec. 5, 2024

(65) Prior Publication Data

US 2025/0230552 A1   Jul. 17, 2025

(30) Foreign Application Priority Data

Jan. 12, 2024   (CN) .......................... 202410046290.7

(51) Int. Cl.
*C23C 24/10* (2006.01)
*B22F 10/25* (2021.01)
(Continued)

(52) U.S. Cl.
CPC ............ *C23C 24/103* (2013.01); *B22F 10/25* (2021.01); *B23K 26/352* (2015.10); *C22C 1/053* (2013.01); *C22C 32/0047* (2013.01)

(58) Field of Classification Search
CPC . C22C 1/053; C22C 32/0047; C22C 32/0052; C22C 32/0057; C22C 32/0063;
(Continued)

(56) References Cited

U.S. PATENT DOCUMENTS

| 2016/0133279 | A1* | 5/2016 | Zhao | ................... C23C 14/0036 204/192.15 |
| 2020/0086387 | A1* | 3/2020 | Sharon | ..................... B22F 10/36 |
| 2020/0199714 | A1* | 6/2020 | Chen | ..................... C22C 1/1084 |

OTHER PUBLICATIONS

Jin, A Review of Laser Cladding on Copper and Copper Alloys, 2022, International Journal of Electrochemical Science 17, Article No. 220920, pp. 1-19. (Year: 2022).*

* cited by examiner

*Primary Examiner* — Monique R Jackson
(74) *Attorney, Agent, or Firm* — Tutunjian & Bitetto, P.C.

(57) ABSTRACT

A high-strength multi-functional coating with a multi-level structure, and a preparation method thereof are provided. In this application, a high-efficiency cladding method based on infrared laser-plasma synchronous compounding is adopted to prepare a micro-scale columnar crystal structure that is perpendicular to a substrate and serves as a pure thermally and electrically conductive channel, and to prepare submicro- and nano-scale ceramic reinforcement phases between columnar crystals, where the submicro- and nano-scale ceramic reinforcement phases are distributed along grain boundaries. The multi-level organizational structure of this application can simultaneously improve the hardness, wear resistance, and electrical and thermal conductivities of a cladding layer for a copper alloy and can improve the reliability of damage protection for a copper alloy component used in an extreme environment.

7 Claims, 3 Drawing Sheets

(51) Int. Cl.
*B23K 26/352* (2014.01)
*C22C 1/053* (2023.01)
*C22C 32/00* (2006.01)

(58) Field of Classification Search
CPC ............ C22C 32/0068; C22C 32/0073; C23C 24/103; C23C 28/021; C23C 28/027; C23C 4/067; B22F 10/25; B23K 26/352; B23K 26/354
See application file for complete search history.

HIGH-STRENGTH MULTI-FUNCTIONAL COATING WITH MULTI-LEVEL STRUCTURE, AND PREPARATION METHOD THEREOF

CROSS REFERENCE TO RELATED APPLICATION

This patent application claims the benefit and priority of Chinese Patent Application No. 2024100462907, filed with the China National Intellectual Property Administration on Jan. 12, 2024, the disclosure of which is incorporated by reference herein in its entirety as part of the present application.

TECHNICAL FIELD

The present disclosure relates to the technical field of surface processing for metallic materials. In view of the problems such as low hardness and poor wear resistance of copper alloys, the present disclosure designs a coating with a multi-level structure and a method for preparing the multi-level structure based on laser-plasma synchronous composite cladding, so as to allow a high bonding strength and wear-resistant and electrically-conductive functions. The present disclosure not only solves the problem that copper alloys have a low hardness and poor wear resistance, but also solves the problem that the improvement of wear resistance is often at the cost of the reduction of electrical conductivity. The present disclosure is suitable for damage protection of copper alloys used in extreme environments such as lead frames, high-speed rail contact wires, rocket engine combustion chambers, nuclear fusion devices, and electromagnetic guns.

BACKGROUND

High-performance copper alloys are one of the key materials for lead frames, high-speed rail contact wires, rocket engine combustion chambers, nuclear fusion devices, and electromagnetic guns. However, these fields require copper alloys to have a high strength, wear resistance, and electrical conductivity, which are essentially contradictory. Thus, the synergistic regulation of a relationship among a strength, wear resistance, and electrical conductivity has become an important research topic for the preparation of high-performance copper alloys. The strengthening of a surface of a copper alloy is an effective way to maintain the strength, toughness, and electrical conductivity and improve the surface hardness and wear resistance for the copper alloy substrate.

The Chinese patent application 201910366779.1 discloses an electroplating process for a copper alloy. In this patent, a process route is optimized to improve the adhesion of a nickel coating to an outer tube, reduce a porosity, and significantly enhance the corrosion resistance. However, a coating prepared by electroplating, spray coating, vapor deposition, or the like has poor adhesion to a substrate, is brittle and thin, and is prone to breakage and falling-off in an actual application process.

The Chinese patent application 202310648023.2 discloses a laser cladding method for a copper alloy substrate. The laser cladding method is as follows: a surface of the copper alloy substrate is polished and cleaned, a glue is uniformly applied to the surface, a nickel-based alloy powder is evenly spread on the surface, and then drying and laser cladding are conducted to produce a target coating. The coating exhibits prominent metallurgical bonding with the copper alloy substrate.

The Chinese patent application 202211655694.3 discloses a preparation method of an electrically-conductive copper-chromium-zirconium alloy. The preparation method is as follows: an end face of an alloy is polished, an alloy powder, a binder, and acetone are spread on the end face, and then oven-drying and laser cladding are conducted to produce an electrically-conductive copper-chromium-zirconium alloy layer.

The Chinese patent application 201980046310.8 discloses a copper-based case-hardened alloy. In the copper-based case-hardened alloy, a hard phase (such as a silicide, a boride, or a carbide) is formed in a copper matrix to improve the wear resistance of the alloy. This method basically does not involve precious Co, Mn, Mo, Ta, V, and W, which can reduce a high hardness of the silicide and improve the crack resistance and machinability of the alloy. The copper-based case-hardened alloy can be used as a raw material for surface strengthening based on laser cladding and plasma cladding.

The Chinese patent application 202010219677.X discloses a multi-scale titanium carbide particle-reinforced copper-based composite coating and a preparation method and use thereof. In this patent, multi-scale titanium carbide particles are added to copper and copper-titanium matrices, and then spark plasma sintering is conducted to obtain a high-hardness, anti-friction, and wear-resistant composite coating. The multi-scale titanium carbide particle-reinforced copper-based composite coating can be used for copper alloy molds, copper alloy crystallizers, and electromagnetic gun rails.

The surface strengthening and coating designs for copper alloys in the above patents can improve the functions such as wear resistance and electrical conductivity of a surface. However, the disadvantages such as a low bonding strength, a complicated pre-treatment process, and an unsatisfactory function limit the application of these designs in surface strengthening. In addition, because a copper alloy undergoes fast heat dissipation and a copper alloy powder exhibits a high reflectivity and a high thermal conductivity during infrared laser cladding, a cladding layer manufactured by infrared laser cladding has a high porosity. In order to solve the problem of high reflection of copper to a laser, green-laser and blue-laser cladding devices are also tested to allow laser cladding or 3D printing for copper alloys. However, the application of these cladding devices is limited due to high prices. It has also been reported to improve an efficiency of cladding or additive manufacturing by compounding different energy beams. For example, the Chinese patent application 202210274501.3 discloses an additive manufacturing method based on plasma-laser compounding. In the additive manufacturing method, the plasma cladding first and then the laser cladding are conducted circularly on a surface of a workpiece, which can improve an efficiency and reduce a residual stress to allow strong binding and thus can improve the wear resistance, impact resistance, corrosion resistance, and resistance to a corrosive wear electromechanical coupling damage for a surface of the workpiece. However, the development of a coating with various functions such as a high strength, wear resistance, and electrical conductivity on a copper alloy substrate, the design of a high-efficiency method where an infrared laser is compounded with a plasma beam and a power is flexibly matched with beam column characteristics according to different thickness and surface quality requirements, the preparation of a multi-level organizational structure, and the development related to improving the damage protection for copper alloys in extreme environments have not been reported inside and outside China.

The Chinese patent application 201310105174.X discloses a multi-electrode coupled arc cross-welding method. In this method, an arc is produced by adding two welding wires, a heat input originally on a workpiece is allowed to act on the welding wires, and the arc is located below a non-melting electrode arc and is compounded with the non-melting electrode arc to produce a molten pool. Because the non-melting electrode arc has a low energy density and a large heat-affected zone, the non-melting electrode arc is suitable for welding, but is not suitable for cladding of a surface, especially a high-accuracy surface. In addition, the non-melting electrode arc cannot allow synchronous wire-feeding and powder-feeding. A powder (a wire) cannot be melted in a beam, and has a poor protective effect, resulting in oxidative burning and deviation of a composition from a design requirement.

SUMMARY

In order to coordinate a contradiction between a strength and an electrical conductivity of a copper alloy, improve the use of copper alloys in extreme environments, and make copper alloys meet performance requirements of engineering components, the present disclosure provides a high-strength, wear-resistant, and electrically-conductive multi-functional coating with a multi-level structure, and designs a high-efficiency cladding method based on infrared laser-plasma synchronous compounding. In the present disclosure, a micro-scale columnar crystal structure perpendicular to a substrate is prepared as a pure thermally and electrically conductive channel, and submicro- and nano-scale ceramic reinforcement phases are produced between columnar crystals and are distributed along grain boundaries. The multi-level organizational structure of the present disclosure can simultaneously improve the hardness, wear resistance, and electrical and thermal conductivities of a cladding layer for a copper alloy, and can improve the reliability of damage protection for a copper alloy component used in an extreme environment.

The present disclosure also provides a method for preparing the high-strength multi-functional coating with a multi-level structure.

In order to allow the above objective, the present disclosure adopts the following technical solutions:

A high-strength multi-functional coating with a multi-level structure is provided, where the high-strength multi-functional coating has a micro-scale columnar crystal structure that is perpendicular to a substrate and is prepared by infrared laser-plasma paraxial synchronous composite cladding; the micro-scale columnar crystal structure serves as a pure thermally and electrically conductive channel; and submicro- and nano-scale ceramic reinforcement phases are produced between columnar crystals, and the submicro- and nano-scale ceramic reinforcement phases are distributed along grain boundaries.

Further, the infrared laser-plasma paraxial synchronous composite cladding is as follows: conducting coaxial powder-feeding by a plasma generator in a main axis direction, and allowing a laser at a side of the plasma generator to work synchronously with the plasma generator on a same vertical plane in a paraxial direction, such that the plasma generator and the laser together act on a molten pool.

Further, components of the high-strength multi-functional coating include an alloy powder and a ceramic powder; and a mass percentage of the alloy powder is 90% to 99% and a mass percentage of the ceramic powder is 1% to 10%.

Further, the alloy powder includes a Cu powder that is mandatory and an optional powder, and the optional powder is one or two selected from the group consisting of Cr, Zr, W, Nb, V, and Ti metal powders; and a raw material for the ceramic powder is one selected from the group consisting of $B_4C$, $C_3N_4$, BN, and SiC.

Further, a mass of the optional powder in the alloy powder is 1% to 8% of a total mass of the alloy powder.

Further, when the optional powder is a composite of two metal powders, a mass proportion of each of the two metal powders is 50%.

Further, a particle size of the alloy powder is 100 μm to 200 μm and a particle size of the ceramic powder is 50 nm to 200 nm.

A preparation method of the high-strength multi-functional coating with a multi-level structure is provided, specifically including the following steps:

step 1 preparation of powders
designing a composition of the coating according to actual needs of a workpiece, and preparing different alloy powders; and weighing and mixing an alloy powder and a ceramic powder according to a specified mass ratio, and oven-drying;

step 2 pretreatment of a surface of the workpiece
soaking the workpiece in an acid solution to remove dirt, washing with water, soaking in alkaline water to neutralize a residual acid solution, washing with warm water, and oven-drying;

step 3 programming of a cladding trajectory as needed
according to a shape, a size, and a cladding region of the workpiece, programming a laser-plasma composite cladding trajectory, and setting a synchronous powder-feeding and automatic control system; and step 4 laser-plasma composite cladding
allowing a plasma generator to work perpendicular to a substrate and in a main axis direction, and allowing a laser at a side of the plasma generator to work synchronously with the plasma generator in a paraxial direction; and during cladding, under Ar atmosphere protection, conducting coaxial powder-feeding by the plasma generator, and allowing a laser beam to assist the plasma generator laterally, such that the plasma generator and the laser beam together act on a molten pool, where the main axis direction refers to a direction perpendicular to a cladded workpiece substrate, and the paraxial direction refers to a direction at an included angle of 45° with the main axis direction.

Further, process parameters of the laser-plasma composite cladding are as follows: a plasma current: 100 A to 200 A, a voltage: 30 V to 60 V, and a beam spot diameter: 10 mm; a laser power: 1 kW to 6 kW, and a laser spot diameter: 2 mm to 4 mm; and a composite cladding distance: 7 mm to 15 mm (which refers to a distance between a lowest end of the plasma generator, namely, an outlet of an ejected beam column, and the surface of the workpiece), a cladding speed: 5 mm/s to 10 mm/s, a powder-feeding rate: 15 g/min to 30 g/min, and a lap rate: 10% to 30%.

The raw material for the ceramic powder of the present disclosure is one selected from the group consisting of $B_4C$, $C_3N_4$, BN, and SiC. Based on the consideration of ceramic reinforcement phases, if increased ceramic reinforcement phases are required, according to elements required to produce the ceramic reinforcement phases, two or even three raw materials can be selected and mixed according to a mass ratio of 1:1:1, such as $B_4C+C_3N_4$. As a result, during a laser cladding process, B, C, and N elements are produced from decomposition, and can react in situ with a molten metal powder such as Cr and Zr to produce ceramic reinforcement phases such as $CrB_2$, $Cr_7C_3$, CrN, $ZrB_2$, ZrC, and ZrN.

The present disclosure has the following beneficial effects:
1. In order to overcome the problems in the prior art, the present disclosure provides a coating with various functions such as a high strength, wear resistance, and electrical conductivity, and designs a high-efficiency cladding method based on infrared laser-plasma synchronous compounding. In the present disclosure, a micro-scale columnar crystal structure perpendicular to a substrate is prepared as a pure thermally and electrically conductive channel, and submicro- and nanoscale ceramic reinforcement phases are produced between columnar crystals and are distributed along grain boundaries. The multi-level organizational structure of the present disclosure can simultaneously improve the hardness, wear resistance, and electrical and thermal conductivities of a cladding layer for a copper alloy, and can improve the reliability of damage protection for a copper alloy component used in an extreme environment.
2. The laser-plasma paraxial synchronous composite cladding of the present disclosure can allow the flexible matching of a power and beam column characteristics of the laser and plasma according to different thickness and surface quality requirements. During cladding, a plasma generator works in a main axis direction and a laser works in a paraxial direction, and the coaxial powder-feeding is conducted by the plasma generator. During cladding, a plasma beam and a laser beam together act on a molten pool. In the molten pool, due to a disturbance impact of an ionized particle flow of the plasma beam on the laser beam, the laser beam is constantly stirred in the molten pool. On the one hand, a powder can be well melted, components can fully diffuse, and a gas can float up. On the other hand, after a composite beam is removed, columnar crystals growing upwards at a bottom of the molten pool can be fully developed due to an action of a composite heat source, and ceramic particles generated by an in-situ reaction are pushed to positions between columnar crystals. The columnar crystals have a diameter of 100 μm to 200 μm. Because there is no particle scattering, a pure thermally and electrically conductive channel effect can be allowed. The ceramic particles between the columnar crystals have a particle size of less than 10 μm and can play a hardening and wear-resistant role during a wear process. According to test results, when a thickness of a cladding layer is 0.5 mm to 3 mm, the cladding layer has an average hardness of 400 $HV_{0.1}$ to 800 $HV_{0.1}$, wear resistance 3 to 8 times higher than the wear resistance of a substrate, and an electrical conductivity of 50% to 80% IACS.
3. The coupling of laser and plasma beams can improve a light absorption rate of a surface of a copper alloy, a utilization rate of a powder, and a bonding strength of a coating with a substrate and reduce a residual stress of a cladding layer to produce a coating with a prominent surface quality, a low porosity, wear resistance, and electrically and thermally conductive functions. In addition, a power and beam column characteristics of laser and plasma beams can be flexibly matched according to different thickness and surface quality requirements. Compared with the traditional surface strengthening method for copper alloys, a cladding layer prepared by the present disclosure has a high strength, wear resistance, electrical conductivity, a high surface quality, a low porosity, and a high bonding strength, and a cladding process of the present disclosure has a high efficiency and allows a controllable thickness. Therefore, the present disclosure is suitable for damage protection of copper alloys in extreme environments such as lead frames, high-speed rail contact wires, rocket engine combustion chambers, nuclear fusion devices, and electromagnetic guns, and is also suitable for the surface strengthening of copper alloys in fields such as marine engineering, petroleum, and chemicals.

BRIEF DESCRIPTION OF THE DRAWINGS

To describe the technical solutions in the embodiments of the present disclosure or in the prior art clearly, the accompanying drawings required for the embodiments are briefly described below. Apparently, the accompanying drawings in the following description show merely some embodiments of the present disclosure, and those of ordinary skill in the art may still derive other accompanying drawings from these accompanying drawings without creative efforts.

DETAILED DESCRIPTION OF THE EMBODIMENTS

In order to make those skilled in the art well understand the technical solutions in the specification, the technical solutions in the examples of the specification are clearly and completely described below in conjunction with the accompanying drawings in the examples of the specification, but are not limited thereto. Any technique not detailed in the present disclosure is the conventional technique in the art.

In the examples, the preparation of the coating of the present disclosure on a copper-chromium-zirconium alloy substrate is taken as an example, a hardness of the substrate tested by a microhardness tester is lower than 200 $HV_{0.1}$, and an electrical conductivity tested by an Eddy current conductivity meter is higher than 75% IACS. For comparability, the hardness and electrical conductivity of each coating in the following examples are tested under the same test conditions as the substrate.

Example 1

Step 1 Preparation of powders: Components of a coating included an alloy powder and a ceramic powder. The alloy powder was mainly a Cu/Cr mixed powder with a particle size of 150 μm. A Cr powder was added in a mass percentage of 3% to a pure Cu powder to obtain the Cu/Cr mixed powder. A ceramic reinforcement phase was synthesized through an in-situ reaction. A raw material for the ceramic reinforcement phase was $B_4C$ with a particle size of 50 nm to 100 nm. A mass percentage of the alloy powder was 95% and a mass percentage of the ceramic powder was 5%.

Step 2 Pretreatment of a surface of a workpiece: A copper-chromium-zirconium alloy was selected as a substrate. The substrate was soaked in an acid solution to remove dirt, then washed with water, then soaked in alkaline water to neutralize a residual acid solution, washed with warm water, and oven-dried.

Step 3 Programming of a cladding trajectory as needed: According to a desired cladding region, a laser-plasma composite cladding trajectory is programmed, and a synchronous powder-feeding and automatic control system is set.

Figure 1:
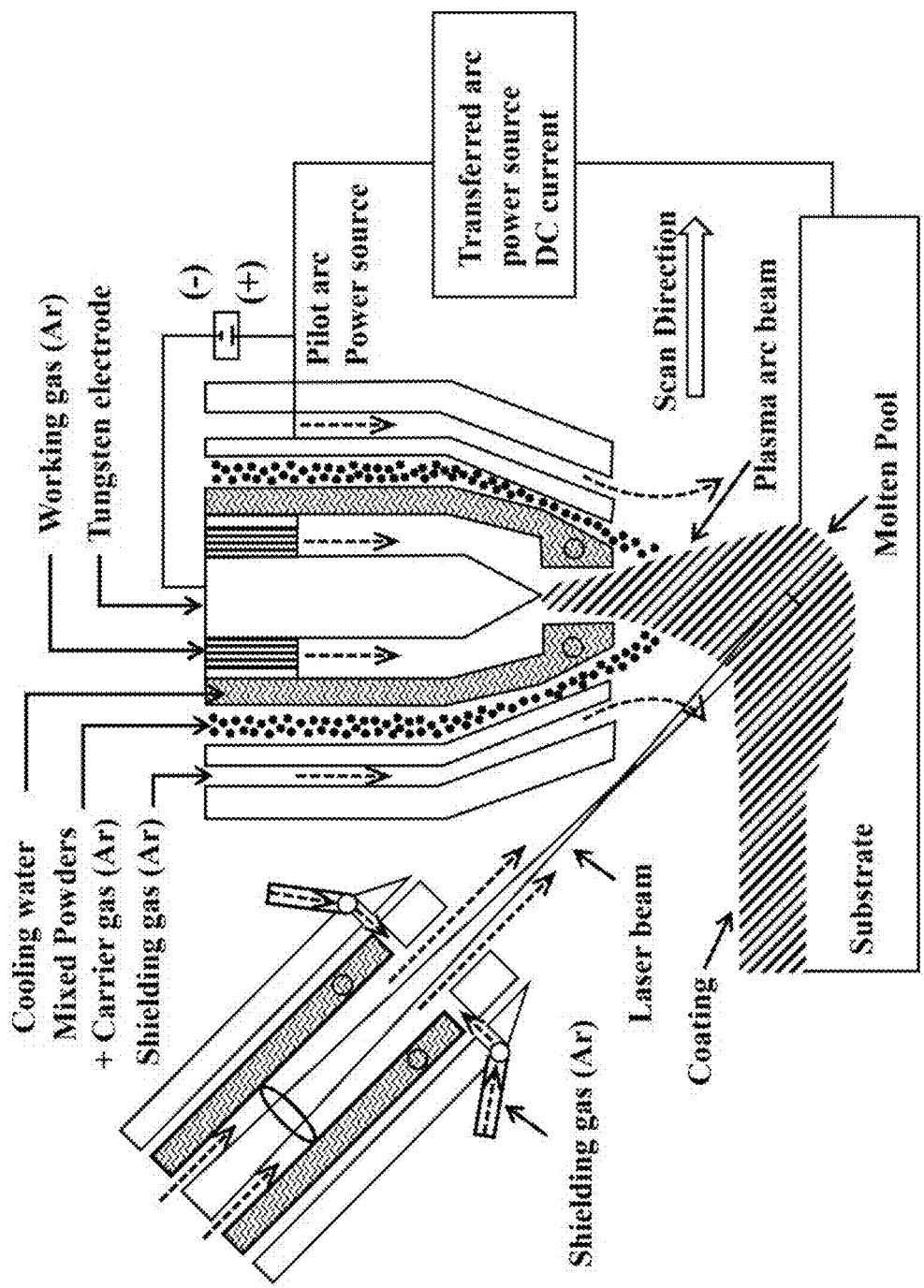
FIG. 1 is a schematic diagram of the laser-plasma composite cladding in the present disclosure.

Step 4 Laser-plasma composite cladding: As shown in FIG. 1, a plasma generator was arranged perpendicular to the substrate. A laser was arranged at a side of the plasma generator and at an included angle of 45° with a main axis of the plasma generator. The plasma generator and the laser were arranged on a same vertical plane. A laser beam was aligned with a molten pool below the plasma generator. Then, a laser-plasma composite cladding automatic system was turned on, such that the plasma generator worked in a cladding direction to allow coaxial powder-feeding, the laser worked synchronously with the plasma generator at a side, and the laser and the plasma generator together acted on the molten pool. Process parameters were as follows: a plasma current: 150 A, a voltage: 30 V, and a beam spot diameter: 10 mm; a laser power: 2 kW, and a laser spot diameter: 3 mm; and a composite cladding distance: 10 mm, a cladding speed: 5 mm/s, a powder-feeding rate: 30 g/min, and a lap rate: 20%.

During a cladding process, the following in-situ reaction occurred to produce the following ceramic phases in the copper alloy:

$$Cr+B_4C \rightarrow CrB_2+Cr_7C_3.$$

Detection of a laser-plasma composite cladding layer produced in the step 4:

The cladding layer had a thickness of 2.5 mm, an average hardness of 600 $HV_{0.1}$, wear resistance 5 times higher than the wear resistance of the substrate, and an electrical conductivity of no less than 60% IACS.

Example 2

Step 1 Preparation of powders: The alloy powder was mainly a Cu/Cr/Zr mixed powder. Cr and Zr powders each were added in a mass percentage of 5% to a pure Cu powder to obtain the Cu/Cr/Zr mixed powder, and the Cr and Zr powders were in a same proportion. The rest were the same as those in Example 1.

Step 2 Pretreatment of a surface of a workpiece: The same as in Example 1.

Step 3 Programming of a cladding trajectory as needed: The same as in Example 1.

Step 4 Laser-plasma composite cladding: The same as in Example 1 except for the following process parameters: a plasma current: 200 A, and a voltage: 50 V; a laser power: 3 kW; and a cladding speed: 8 mm/s, and a powder-feeding rate: 30 g/min.

During a cladding process, the following in-situ reaction occurred to produce the following ceramic phases in the copper alloy:

$$Cr+Zr+B_4C \rightarrow CrB_2+Cr_7C_3+ZrB_2+ZrC.$$

The rest were the same as those in Example 1.

Detection of a laser-plasma composite cladding layer produced in the step 4:

The cladding layer had a thickness of 1.5 mm, an average hardness of 700 HV0.1, wear resistance 6 times higher than the wear resistance of the substrate, and an electrical conductivity of no less than 60% IACS.

Example 3

Step 1 Preparation of powders: The alloy powder was mainly a Cu/Cr/Ti mixed powder, and the ceramic powder was BN. Cr and Ti powders each were added in a mass percentage of 8% to a pure Cu powder to obtain the Cu/Cr/Ti mixed powder, and the Cr and Ti powders were in a same proportion. A mass percentage of the alloy powder was 90% and a mass percentage of the ceramic powder was 10%. The rest were the same as those in Example 1.

Step 2 Pretreatment of a surface of a workpiece: The same as in Example 1.

Step 3 Programming of a cladding trajectory as needed: The same as in Example 1.

Step 4 Laser-plasma composite cladding: The same as in Example 1 except for the following process parameters: a plasma current: 200 A, and a laser power: 3 kW.

During a cladding process, the following in-situ reaction occurred to produce the following ceramic phases in the copper alloy:

$$Cr+Ti+BN \rightarrow CrB_2+CrN+TiB_2+TiN.$$

The rest were the same as those in Example 1.

Detection of a laser-plasma composite cladding layer produced in the step 4:

The cladding layer had a thickness of 3 mm, an average hardness of 800 $HV_{0.1}$, wear resistance 8 times higher than the wear resistance of the substrate, and an electrical conductivity of no less than 50% IACS.

Figure 2A:
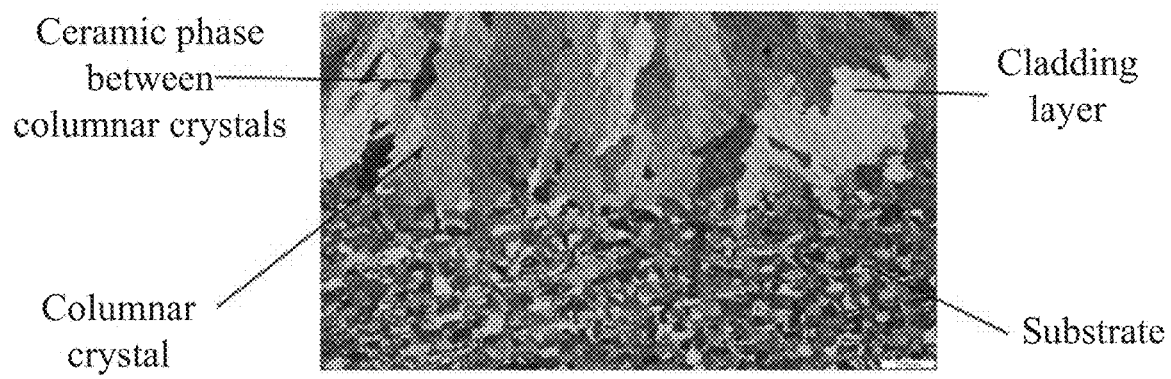
FIG. 2A and FIG. 2B show a cross-sectional organizational structure and a planar organizational structure of a cladding layer, respectively.
Figure 2B:
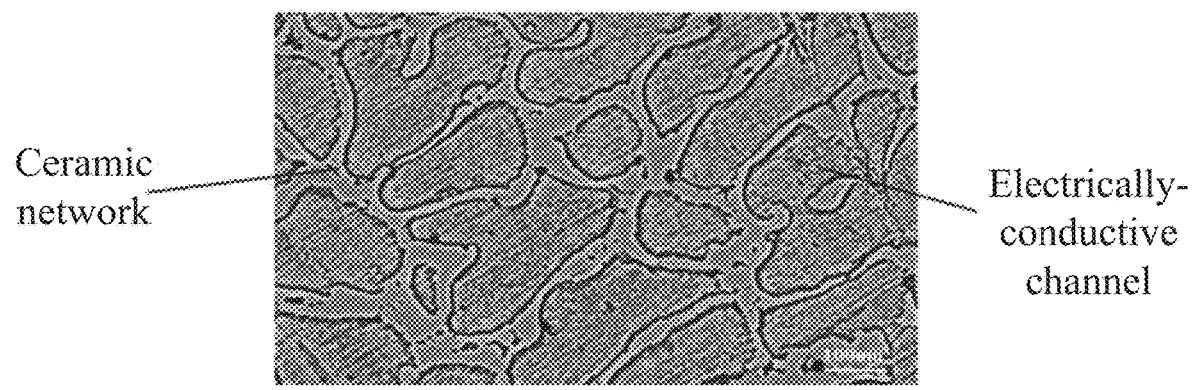

In the present disclosure, while columnar crystals grow in a molten pool, ceramic particles produced by an in-situ reaction are pushed to positions between columnar crystals. The ceramic particles between columnar crystals have a particle size of less than 10 μm, and the columnar crystals have a diameter of 100 μm to 200 μm. It can be seen from the cross-sectional organizational structure of the cladding layer in FIG. 2A that the cladding layer has a micro-scale columnar crystal structure perpendicular to the substrate. The micro-scale columnar crystal structure exhibits prominent metallurgical bonding with the substrate, and serves as a pure thermally and electrically conductive channel. Sub-micro- and nano-scale ceramic reinforcement phases are produced between columnar crystals, and the submicro- and nano-scale ceramic reinforcement phases are distributed along grain boundaries. It can also be seen from the planar organizational structure of the cladding layer in FIG. 2B that ceramic particles are distributed at grain boundaries to form a wear-resistant strengthened grid, which significantly improves the hardness and wear resistance of the cladding layer. Because there is no particle scattering, columnar crystals have a pure thermally and electrically conductive channel effect. The ceramic particles can play a hardening and wear-resistant role during a wear process. In summary, the coupling of laser and plasma beams can improve a light absorption rate of a surface of a copper alloy and a utilization rate of a powder, and allows the preparation of a coating with a prominent surface quality, a low porosity, wear resistance, and electrically and thermally conductive functions.

Figure 3:
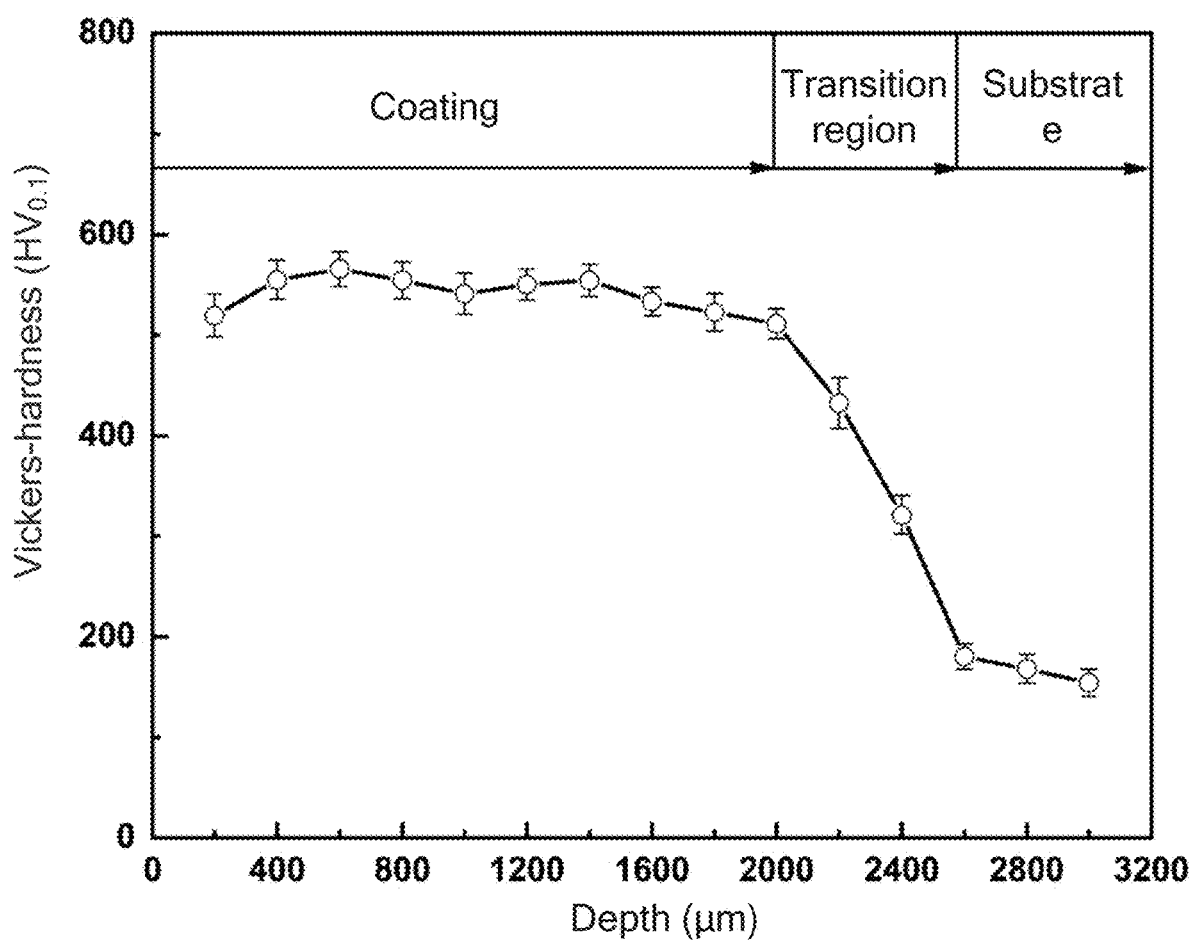
FIG. 3 shows a hardness distribution of the high-strength multi-functional coating with a multi-level structure in the present disclosure.

FIG. 3 shows a hardness distribution of the high-strength multi-functional coating with a multi-level structure in the present disclosure. It can be seen from FIG. 3 that, in a direction of the substrate-a transition layer-a coating, a hardness gradually increases, which also confirms that the ceramic reinforcement phases are distributed along grain boundaries and play a hardening and wear-resistant role during a wear process.

The above are merely three examples of the present disclosure and do not limit the technical solutions of the present disclosure. When the present disclosure is implemented, a power and beam column characteristics of the laser and plasma can be flexibly matched according to different thickness and surface quality requirements. During a cladding process, different in-situ reactions will occur according to the selection of the alloy powder and the ceramic powder, and a large number of ceramic phases can be produced in a copper alloy. For example, in addition to the in-situ reactions listed in the above examples, when the optional powder in the alloy powder is a Zr/V mixed powder and the ceramic powder is a $C_3N_4$ mixed powder, the following in-situ reaction occurs: $Zr+V+C3N4-ZrC+ZrN+VC+VN$. Therefore, the selection of raw materials is not the focus of the present disclosure. The innovation of the present disclosure is mainly as follows: The following novel composite cladding technology is provided: the coaxial powder-feeding is conducted by a plasma generator, and a laser assists the plasma generator at a side, such that the plasma generator and the laser together act on a molten pool. As a result, a prepared coating has a columnar crystal structure perpendicular to a substrate. Columnar crystals serve as thermally and electrically conductive channels, and ceramic particles distributed at grain boundaries play a wear-resistant role. In addition, in the present disclosure, the laser is arranged at a side of the plasma generator, which is based on a demand of a cladding thickness. If a large cladding thickness and powder-feeding rate are required, a laser can be arranged at each of two sides of the plasma generator. It should be noted that those of ordinary skill in the art may further make several improvements and modifications without departing from the principle of the present disclosure, but such improvements and modifications should be deemed as falling within the protection scope of the present disclosure.

What is claimed is:

1. A coating, the coating being prepared by infrared laser plasma paraxial synchronous composite cladding and components of the coating comprising copper alloy powder and ceramic powder,
    wherein a mass percentage of the copper alloy powder is 90% to 99%, and a mass percentage of ceramic powder is 1% to 10%, wherein
    the coating has a micro-scale columnar crystal structure; the micro-scale columnar crystal structure serves as a pure thermally and electrically conductive channel; and submicro- and nano-scale ceramic reinforcement phases are produced between columnar crystals, and the submicro- and nano-scale ceramic reinforcement phases are distributed along grain boundaries;
    the columnar crystals each have a diameter of 100 μm to 200 μm; and
    the copper alloy powder has a particle size of 100 μm to 200 μm, and the ceramic powder has a particle size of 50 nm to 200 nm.

2. The coating according to claim 1, wherein the infrared laser-plasma paraxial synchronous composite cladding is conducted as follows: conducting coaxial powder-feeding by a plasma generator in a main axis direction, and allowing a laser at a side of the plasma generator to work synchronously with the plasma generator on a same vertical plane in a paraxial direction, such that the plasma generator and the laser together act on a molten pool.

3. The coating according to claim 1, wherein the copper alloy powder comprises a Cu powder that is mandatory and an optional powder, and the optional powder is one or two selected from the group consisting of Cr, Zr, W, Nb, V, and Ti metal powders; and a raw material for the ceramic powder is one selected from the group consisting of $B_4C$, $C_3N_4$, BN, and SiC.

4. The coating according to claim 3, wherein a mass of the optional powder in the alloy powder is 1% to 8% of a total mass of the copper alloy powder.

5. The coating according to claim 3, wherein when the optional powder is a composite of two metal powders, a mass proportion of each of the two metal powders is 50%.

6. A method for preparing the coating according to claim 1, specifically comprising the following steps:
    step 1 preparation of powders
    designing a composition of the coating according to actual needs of a workpiece, and preparing different copper alloy powders; and weighing and mixing the copper alloy powders and the ceramic powder, and oven-drying;
    step 2 pretreatment of a surface of the workpiece
    soaking the workpiece in an acid solution to remove dirt, washing with water, soaking in alkaline water to neutralize a residual acid solution, washing with warm water, and oven-drying;
    step 3 programming of a cladding trajectory as needed
    according to a shape, a size, and a cladding region of the workpiece, programming a laser-plasma composite cladding trajectory, and setting a synchronous powder-feeding and automatic control system; and
    step 4 laser-plasma composite cladding
    allowing a plasma generator to work perpendicular to the workplace and in a main axis direction, and allowing a laser at a side of the plasma generator to work synchronously with the plasma generator in a paraxial direction; and during cladding, under Ar atmosphere protection, conducting coaxial powder-feeding by the plasma generator, and allowing a laser beam to assist the plasma generator laterally, such that the plasma generator and the laser beam together act on a molten pool,
    wherein the main axis direction refers to a direction perpendicular to a cladded workpiece substrate, and the paraxial direction refers to a direction at an included angle of 45° with the main axis direction.

7. The method for preparing the coating according to claim 6, wherein process parameters of the laser-plasma composite cladding are as follows: a plasma current: 100 A to 200 A, a voltage: 30 V to 60 V, and a beam spot diameter: 10 mm; a laser power: 1 kW to 6 kW, and a laser spot diameter: 2 mm to 4 mm; and a composite cladding distance: 7 mm to 15 mm, a cladding speed: 5 mm/s to 10 mm/s, a powder-feeding rate: 15 g/min to 30 g/min, and a lap rate: 10% to 30%.

* * * * *